May 20, 1958 L. BLACK 2,835,094
SCRUB TIMBER AND BRUSH CUTTER
Filed Oct. 1, 1954 2 Sheets-Sheet 1
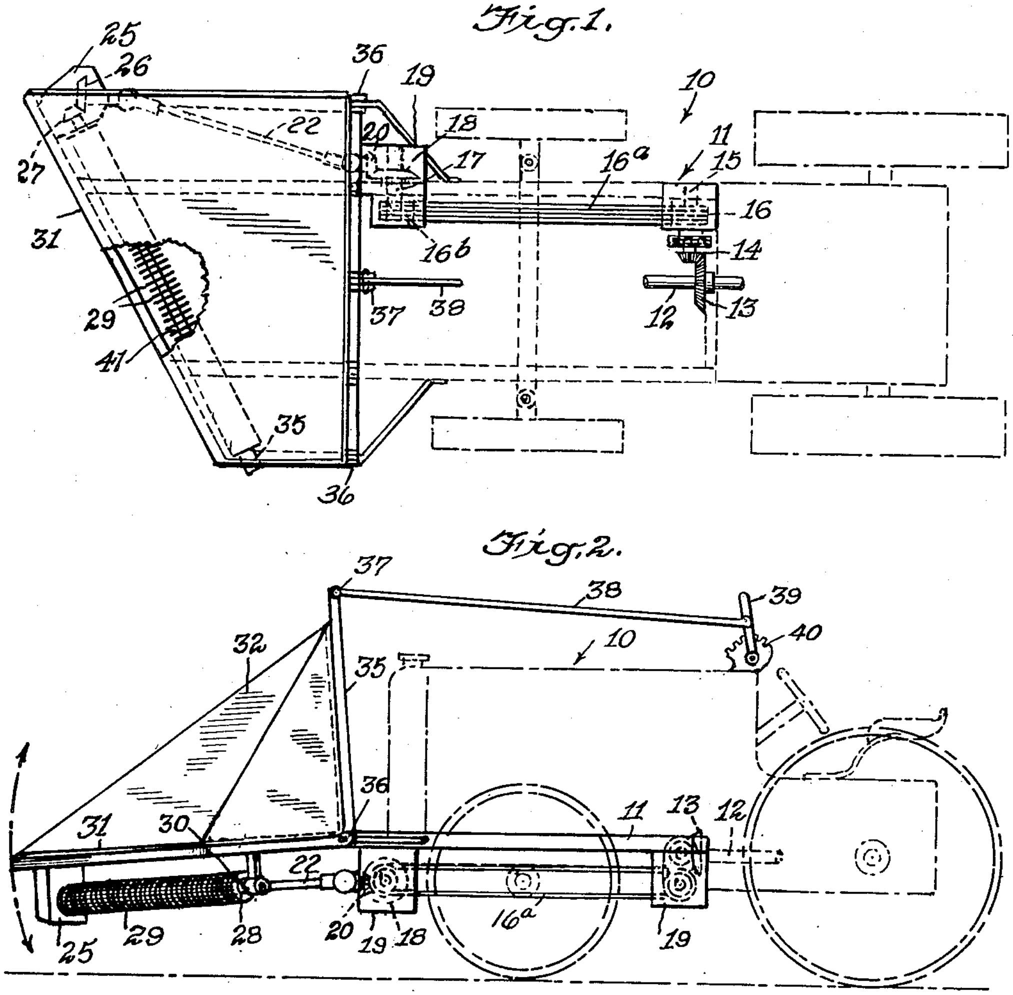
INVENTOR
Leonard Black
BY
Munn, Liddy, Nathanson & March
ATTORNEYS SCRUB TIMBER AND BRUSH CUTTER
Filed Oct. 1, 1954 2 Sheets-Sheet 2
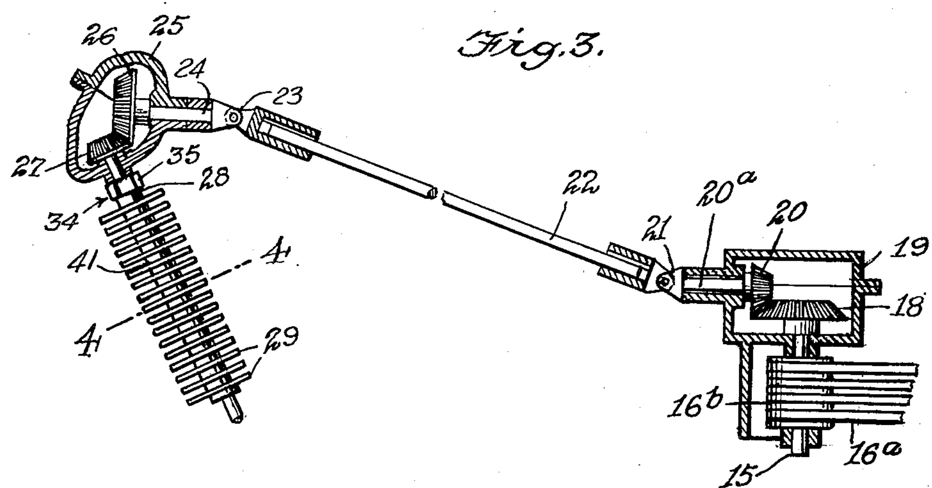
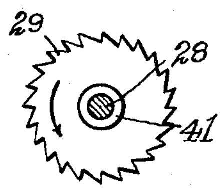
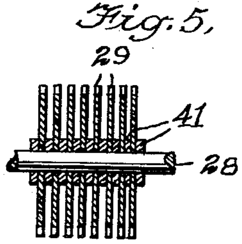
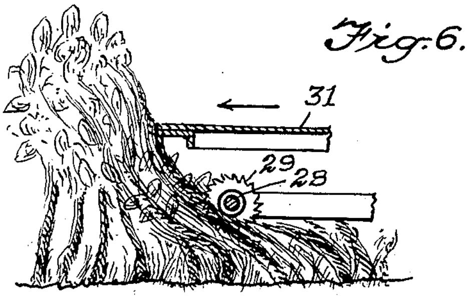
INVENTOR
Leonard Black
BY
Munn, Liddy, Nathanson & March
ATTORNEYS

United States Patent Office 2,835,094

Patented May 20, 1958

2,835,094

SCRUB TIMBER AND BRUSH CUTTER

Leonard Black, Prescott, Ariz.

Application October 1, 1954, Serial No. 459,609

3 Claims. (Cl. 55—118)

This invention relates to means for removing brush undergrowth and more particularly to a scrub timber and brush cutter removably secured to a tractor or the like and adapted to be operated by the tractor itself.

Heretofore many attempts were made to provide a suitable cutter for disposing of scrub timber and heavy underbrush from fields or the like whereby the fields may be tilled or other uses made of them. However, the devices proposed do not prove completely satisfactory because their construction is such that the brush had to be cut while in standing position so that the leaves and foliage interfere with the cutting action and because of the construction of the saws themselves which were so made as to not catch all pieces of brush but rather would allow some brush to remain standing and become fouled in the mechanism of the cutter itself.

It is an object of the present invention to provide a scrub timber and brush cutter which is adapted to be operated by a tractor or the like to which the same is secured.

It is a further object of the present invention to provide a scrub timber and brush cutter which is adjustable to varying heights for cutting purposes.

It is still a further object of the present invention to provide a scrub timber and brush cutter which effectively cuts all the brush in the path of the cutting elements.

It is still a further object of the present invention to provide a scrub timber and brush cutter which by its construction will present to the saw only that portion of the scrub timber or brush which is to be cut.

It is a further object of the present invention to provide a scrub timber and brush cutter having all the desired features which is nevertheless inexpensive to manufacture and easy to operate and install on the vehicle on which it is to be used.

Other objects and advantages are set forth in greater detail in the accompanying specification taken in conjunction with the accompanying drawing, in which:

Fig. 1 is a top plan view partly in section showing the scrub timber and brush cutter of the present invention mounted on a tractor;

Fig. 2 is a side elevation view partly in section of the scrub timber and brush cutter of the present invention mounted on a track;

Fig. 3 is a top plan partially broken view of the operating mechanism for driving the scrub timber and brush cutter of the present invention;

Fig. 4 is a section taken along the lines 4—4 of Fig. 3 but with the cutters shown as of enlarged diameter;

Fig. 5 is an axial sectional view of the cutting element but with the cutters shown as of enlarged diameter; and Fig. 6 is a broken away side view of the scrub timber and brush cutter of the present invention in operation cutting heavy underbrush.

Referring to the drawings, there is shown a tractor 10 of the conventional type. A scrub timber and brush cutter 11 is removably secured to the tractor. The scrub timber and brush cutter 11 consists of a shaft 12 engaging the power driving means or the rear axle of the tractor and adapted to be turned thereby. Affixed to the shaft 12 is a bevel gear 13. Another bevel gear 14 having a shaft 15 is provided in mesh with the bevel gear 13. A pulley 16 is carried by the shaft 15 and drives belts *16a* passing around a second pulley *16b*. There is provided another shaft 17 carrying the pulley *16b*. The shaft 17 is provided at one extremity with a bevel gear 18. A housing 19 is provided containing the bevel gear 18 and another bevel gear 20 in mesh with the first gear 18. The bevel gear 20 is provided with a shaft 20(*a*) connected at its extremity to a universal ball joint 21 and a shaft 22. The shaft 22 which can be shortened or lengthened according to its position by the slidable connection as shown, is connected at its other extremity to another universal ball joint 23 and a shaft 24. To the shaft 24 there is secured within a housing 25 a bevel gear 26 in mesh with a bevel gear 27. The bevel gear 27 drives a shaft 28 which is provided with a plurality of relatively small closely spaced rotary cutters 29 constituting an elongate rotary saw element. The shaft 28 of the rotary saw element at its other end turns in a bearing block 30. Supporting said block is a pusher attachment structure 31 covered on the top side preferably with sheet steel 32. The pusher attachment structure, as shown, slopes downward at a rather sharp angle for the purposes hereinafter set forth. It is to be noted that the rotary saw element 29 is preferably set at an angle to the line of travel of the tractor for reasons hereinafter set forth. The shaft 28 is splined at its extremity 34 which fits into a collar 35 so that it may be easily detached from the unit.

The pusher attachment structure 31 is secured to a supporting bar 35 pivotally mounted at 36 and 37 to a rod 38. The rod 38 is connected to a handle 39 which is connected to a stop 40 for raising and lowering the pusher attachment structure 31 and rotary saw element 29, which is remote from the pivotal mounting, to any position and maintaining the same in that position.

Heretofore brush cutters have been proposed in which attempts were made to cut the brush while standing with large saws whose plane is substantially parallel to the ground. In this construction there were openings between the saws themselves so that all pieces of brush were not cut, but some remained standing and became fouled in the mechanism of the cutter itself. In addition when large brush was cut, the pieces would jam the mechanism of the cutter. According to the present invention, however, I have provided a scrub timber and brush cutter which eleminates all of these difficulties. There is provided the pusher attachment structure 31 which when operating on substantially smooth ground, slopes downward, as shown, at a substantially sharp angle to engage the lower limbs of the scrub timber and the lower portion of the brush prior to their being contacted by the rotary saw element 29 itself. This pushing forward bends the brush and timber over and prevents pinching of the saws. In addition, the angular disposition of the pusher attachment structure to the line of travel of the tractor, as shown, enables the scrub timber and brush cutter of the present invention to roll the timber and brush forward and off to one side after it has been cut by the saw, making it unnecessary to back away after cutting, which was a defect of cutters heretofore proposed.

It is to be noted that the rotary saw element 29 comprises a series of relatively small circular saws so constructed as to act as an elongate rotary thin saw element. The saws are disposed with their cutting edges at right angles to the ground. With this construction the saws cut with a semi-ripping action shredding the timber and brush in a very satisfactory manner. There is preferably provided spacers 41 between each of the blades of the saw which allow room for sawdust and also permit the saws to cut clean. The pusher attachment structure and saws may be adjusted to any desired height about the pivots 36 and 37 by manipulation of the handle 39. At the desired height the pusher attachment structure and saws may be locked in position, as shown in Fig. 2.

In Fig. 6 there is clearly shown the operation of the pusher attachment structure 31 and rotary saw element 29 in conjunction with each other wherein the pusher attachment structure 31 is pressing forward against the brush permitting the rotary saw element 29 to shred and cut the rest of the brush which is then thrust off to one side by reason of the angle of the pusher attachment structure 31 and the rotary saw element 29.

In the operation of the scrub timber and brush cutter of the present invention, the pusher attachment structure 31 and rotary saw element 29 is first adjusted to the desired height by means of movement of the handle 39 about the stop 40 and the frame and rotary saw element are maintained in the desired position. A tractor is started whereby the shaft 12 is turned in a clockwise direction turning with it the bevel gear 13 affixed thereto. Movement of the bevel gear 13 which is meshed with the bevel gear 14 causes the latter to turn rotating the shaft 15. The pulley is carried by one end of the shaft 15, as shown, is caused to move turning the belt **16*a*, the pulley 16*b* and the shaft 17 causing the bevel gear 18 to rotate. The rotation of the bevel gear 18 which is in mesh with the bevel gear 20, also causes the latter to turn along with the shafts 20**(*a*), 22 and 24. The turning of the shaft 24 causes rotation of the bevel gear 25, which latter being in mesh with bevel gear 27 also causes this bevel gear to rotate. The shaft 28 affixed to bevel gear 27 and carrying the rotary saw element 29 is also rotated in the direction of the arrow shown in Fig. 4. The forward thrust of the tractor causes the pusher attachment structure 31 to push the scrub timber and brush, as shown in Fig. 6, with the rotary saw elements 29 grinding and cutting the scrub timber or brush near the base thereof. The angular direction of the pusher attachment structure 31 and rotary saw element 29 as hereinabove described, causes the scrub timber or brush to be pushed to one side out of the path of the tractor. The particular arrangement and construction of the rotary saw element causes the timber and brush to be cut with a semi-ripping action in a completely satisfactory operation. In addition, the construction of the pusher attachment structure 31 is such that the scrub timber or brush is bent away from the rotary saw element 29 enabling the appropriate portions of the scrub timber or brush to be presented for cutting purposes. In this fashion there has been presented an efficient, workmanlike scrub timber and brush cutter which will eliminate the scrub timber and brush easily without danger of their being jammed in the saw teeth, but rather the operation is performed in a completely satisfactory manner.

While the invention has been described in some detail, it will be understood that variations and modifications may be made without departing from the spirit of the invention or the scope of the appended claims.

I claim:

1. A brush cutting device for attachment to a vehicle, comprising a substantially horizontal pusher attachment structure having an elongate front edge, the width of the pusher attachment structure being on the same order of magnitude as the width of the vehicle; means for mounting the pusher attachment structure on the front of the power vehicle; an elongate, rotary cutting means extending virtually for the full width of the pusher attachment structure, said means being carried closely adjacent the front edge of said pusher attachment structure, said means having a length which is a large multiple of its diameter and comprising a single, heavy, rigid, rotary shaft extending substantially horizontally for the full width of the pusher attachment structure between the opposite sides thereof, said shaft having a plurality of small closely spaced rotary saw cutters provided with teeth constituting an elongate rotary saw element; means mounting the shaft on the pusher attachment structure for turning movement, comprising solely one pair of bearings for said shaft, a bearing being located at each side of the pusher attachment structure and said shaft being unsupported intermediate its ends; and drive means including a shaft extending rearward from the front edge of the pusher attachment structure at virtually the same level as the cutting means and rigid shaft therefor for effecting rotation of said rotary saw element.

2. A brush cutting device comprising a pusher attachment structure; means for pivotally mounting the pusher attachment structure on a power vehicle; a shaft carried at one edge of the pusher attachment structure remote from the pivotal mounting thereof, said shaft having a plurality of relatively small closely spaced rotary cutters constituting an elongate rotary toothed saw element having a length greatly in excess of its diameter; a second shaft mounted adjacent and parallel to the pivot for the pusher attachment structure adapted to receive power from the vehicle; and drive means interconnecting said shafts for simultaneous rotation, said drive means permitting the pusher attachment structure to be swung about its pivot without interference.

3. A brush cutting device for attachment to a vehicle, comprising a substantially horizontal pusher attachment structure having an elongate front edge, the width of the pusher attachment structure being on the same order of magnitude as the width of the vehicle; means for pivotally mounting the pusher attachment structure on the front of the power vehicle; said front edge of the pusher attachment structure being disposed out of perpendicular with the line of travel of said power vehicle; a shaft carried at one edge of the pusher attachment structure remote from the pivotal mounting thereof, said shaft having a plurality of relatively small closely spaced toothed rotary cutters constituting an elongate rotary toothed saw element angularly disposed at substantially the same angle as said pusher attachment structure; a second shaft mounted adjacent and parallel to the pivot for the pusher attachment structure adapted to receive power from the vehicle; and drive means interconnecting said shafts for simultaneous rotation, said drive means permitting the pusher attachment structure to be swung about its pivot without interference.

References Cited in the file of this patent

UNITED STATES PATENTS

| | | |
|---|---|---|
| 1,335,266 | Zander | Mar. 30, 1920 |
| 1,710,749 | Svensgaard | Apr. 30, 1929 |
| 1,795,182 | Ross | Mar. 3, 1931 |